US006973667B2

(12) United States Patent
Fritsch

(10) Patent No.: US 6,973,667 B2
(45) Date of Patent: Dec. 6, 2005

(54) METHOD AND SYSTEM FOR PROVIDING TIME-SHIFTED DELIVERY OF LIVE MEDIA PROGRAMS

(75) Inventor: Jean-Georges Fritsch, Los Altos, CA (US)

(73) Assignee: Minerva Networks, Inc., Santa Clara, CA (US)

(*) Notice: Subject to any disclaimer, the term of this patent is extended or adjusted under 35 U.S.C. 154(b) by 1045 days.

(21) Appl. No.: 09/798,264

(22) Filed: Mar. 1, 2001

(65) Prior Publication Data

US 2002/0124258 A1  Sep. 5, 2002

(51) Int. Cl.[7] .................. H04N 7/173; H04N 5/90; H04L 12/56; H04J 3/24

(52) U.S. Cl. .................. 725/88; 725/87; 725/91; 725/97; 725/101; 725/102; 386/125; 386/126; 370/390; 370/474

(58) Field of Search ...... 386/68, 125, 126; 725/87–88, 725/91, 94, 97, 101–104; 370/390, 474

(56) References Cited

U.S. PATENT DOCUMENTS

| | | | | | |
|---|---|---|---|---|---|
| 5,132,992 | A | * | 7/1992 | Yurt et al. | 375/240 |
| 5,453,779 | A | * | 9/1995 | Dan et al. | 725/88 |
| 5,557,724 | A | * | 9/1996 | Sampat et al. | 725/43 |
| 5,583,561 | A | * | 12/1996 | Baker et al. | 725/93 |
| 5,815,662 | A | * | 9/1998 | Ong | 725/92 |
| 6,055,314 | A | * | 4/2000 | Spies et al. | 380/228 |
| 6,543,053 | B1 | * | 4/2003 | Li et al. | 725/88 |
| 2002/0007494 | A1 | * | 1/2002 | Hodge | 725/109 |
| 2002/0048275 | A1 | * | 4/2002 | Atwater et al. | 370/409 |
| 2002/0124262 | A1 | * | 9/2002 | Basso et al. | 725/109 |
| 2003/0149988 | A1 | * | 8/2003 | Ellis et al. | 725/87 |

* cited by examiner

Primary Examiner—Hai Tran
Assistant Examiner—Son P. Huynh
(74) Attorney, Agent, or Firm—Roger H. Chu

(57) ABSTRACT

Improved approaches for delivering media programs to viewers (e.g., subscribers) are disclosed. The media programs are typically broadcast in accordance with a schedule. The media program can be delivered to viewers through multicast or unicast. According to one aspect, the media programs are buffered (e.g., cached) in a data packet format such that producing unicasts for particular viewers requires less computation and resources such that more concurrent unicasts are able to be effectively supported.

22 Claims, 8 Drawing Sheets

FIG. 1 *(Prior Art)*

METHOD AND SYSTEM FOR PROVIDING TIME-SHIFTED DELIVERY OF LIVE MEDIA PROGRAMS

CROSS-REFERENCE TO RELATED APPLICATIONS

This application is related to: (1) U.S. patent application Ser. No. 09/585,707, filed May 31, 2000, entitled "METHOD AND SYSTEM FOR RECORDING SCHEDULED PROGRAMS WITHOUT LOCAL RECORDING EQUIPMENT"; (2) U.S. patent application Ser. No. 09/595,848, Now U.S. Pat. No. 6,769,127, filed Jun. 16, 2000, entitled "METHOD AND SYSTEM FOR DELIVERING MEDIA SERVICES AND APPLICATIONS OVER NETWORKS"; (3) U.S. patent application Ser. No. 09/595,838, filed Jun. 16, 2000, entitled "METHOD AND SYSTEM FOR REPLAYING/REWINDING LIVE BROADCASTS"; and (4) U.S. application Ser. No. 09/781,118, filed Feb. 8, 2001, entitled "METHOD AND SYSTEM FOR DELIVERY OF ENCRYPTED PROGRAMS OVER IP NETWORKS". Each of these above-identified related applications is hereby incorporated herein by reference for all purposes.

BACKGROUND OF THE INVENTION

1. Field of the Invention

The present invention is generally related to media broadcasting and, more particularly, to techniques for delivery of media programs to subscribers over a network.

2. Description of the Related Art

Continuous or on-demand media information such as video and audio programs have been broadcasted over data networks. Broadcast of such media information over data networks by digital broadcasting systems provides many advantages and benefits that cannot be matched by current television cable systems or over-the-air broadcasting.

With digital broadcasting systems, service providers are often able to draw viewers into an exciting, interactive and enhanced television or viewing experience. Recently, the viewers have been given viewer control functions (e.g., VCR-type functions), such as pause, resume and instant replay.

FIG. 1 illustrates a block diagram of a conventional media delivery system 100 that provides viewer control functions. Media program content 102 is received at the media delivery system 100. The media program content 102 can come from a storage device or a real-time broadcast from any of various sources. Often, the media program content is unencrypted or has already been unencrypted if received as an encrypted source. Before the media program content is redistributed to subscribers, an encryption unit 104 can encrypt the media program content so that the content delivered over a network to client machines (or the subscribers) is protected through encryption. The resulting encrypted broadcast 106 is then sent to an IP stack 108 where the broadcast is packetized for delivery over a network through a network interface 110. Here, the resulting data packets can be multicast over the network to those subscribers requesting the program. To facilitate viewer control functions, a buffer 112 is used to store one or more current or recent programs. At the same time as the resulting encrypted broadcast 106 is sent to the IP stack 108, the resulting encrypted broadcast 106 is stored (i.e., cached) into the buffer 112. Thereafter, in supporting viewer control functions, viewers can be delivered encrypted program content by unicasts from the buffer 112 after such content is packetized by the IP stack 108.

One disadvantage of conventional media delivery systems is that the packetization processing for the multicast must be carried out but at the same time that the packetization processing is carried out for each of the unicasts, which creates a substantial computational burden to a delivery system. The computation burden further limits the number of streams that the media delivery system can support and also can require increased system performance (e.g., processor, host bus, and memory).

Thus, there is a need for improved techniques for cost effective ways for service providers to securely deliver programs to subscribers over an open network.

SUMMARY OF THE INVENTION

Broadly speaking, the invention relates to improved approaches for delivering media programs to viewers (e.g., subscribers). The media programs are typically broadcast in accordance with a schedule. The media programs can be delivered to viewers through multicast or unicast. According to one aspect of the invention, the media programs are buffered (e.g., cached) in a data packet format such that producing unicasts for particular viewers requires less computation and resources such that more concurrent unicasts are able to be effectively supported.

The invention can be implemented in numerous ways including, a method, system, device, and a computer readable medium. Several embodiments of the invention are discussed below.

As a method for delivering media program content to users over a network, one embodiment of the invention includes at least the acts of: receiving media program content to be delivered to one or more users; converting the media program content being received into data packets; and multicasting the data packets to those of the users desirous of viewing the media content program, wherein the data packets are being substantially simultaneously stored into a buffer storage device.

As a method for delivering media program content to users, one embodiment of the invention includes at least the acts of: receiving media program content to be delivered to one or more users; converting the media program content being received into data packets; multicasting the data packets to those of the users desirous of viewing the media content program; storing the data packets into a buffer storage device; receiving a request from a particular user of the users receiving the multicasting, the request including a number of attributes; and rearranging the particular user, in response to the request, with respect to the users receiving the multicasting.

As a method for delivering media program content to subscribers in accordance with subscriber control, one embodiment of the invention includes at least the acts of: receiving media program content to be delivered to one or more subscribers; converting the media program content being received into data packets; multicasting the data packets to those of the subscribers desirous of viewing the media content program; storing the data packets into a buffer storage device; receiving a pause request from a particular subscriber of the subscribers receiving the multicasting, the pause request including at least pause attributes; removing, in response to the pause request, the particular subscriber of the subscribers receiving the multicasting; subsequently receiving a resume request from the particular subscriber; and unicasting, in response to the resume request, the data packets of the media content program to the particular subscriber from the buffer storage device in accordance with the pause attributes associated therewith.

As a method for delivering media program content to subscribers in accordance with subscriber control, one embodiment of the invention includes at least the acts of: receiving media program content to be delivered to one or more subscribers; converting the media program content being received into data packets; multicasting the data packets to those of the subscribers desirous of viewing the media content program; storing the data packets into a buffer storage device; receiving a pause request from a particular subscriber of the subscribers receiving the multicasting, the pause request including at least pause attributes; removing, in response to the pause request, the particular subscriber of the subscribers receiving the multicasting; subsequently receiving a golive request from the particular subscriber; and adding, in response to the golive request, the particular subscriber to the subscribers receiving the multicasting of the data packets of the media content program.

As a method for delivering media program content to subscribers in accordance with subscriber control, one embodiment of the invention includes at least the acts of: receiving media program content to be delivered to one or more subscribers; converting the media program content being received into data packets; multicasting the data packets to those of the subscribers desirous of viewing the media content program; storing the data packets into a buffer storage device; receiving an instant replay request from a particular subscriber of the subscribers receiving the multicasting; removing, in response to the instant replay request, the particular subscriber from the subscribers receiving the multicasting; and unicasting, in response to the instant replay request, the data packets of the media content program to the particular subscriber from the buffer storage device in accordance with a replay point.

As a media delivery center that couples to a network for delivery of media program contents to subscribers, one embodiment of the invention comprises: a protocol conversion unit that receives a media stream of a media program and converts the media stream into data packets; a network interface that couples to a physical network; a multicast delivery unit that delivers the data packets for the media program to a plurality of subscribers in a multicast format; a buffer that stores the data packets for the media program; a unicast delivery unit that delivers the data packets for the media program from the buffer to individual subscribers in a unicast format.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved approaches for delivering media programs to viewers (e.g., subscribers). The media programs are typically broadcast in accordance with a schedule. The media program can be delivered to viewers through multicast or unicast. According to one aspect of the invention, the media programs are buffered (e.g., cached) in a data packet format such that producing unicasts for particular viewers requires less computation and resources such that more concurrent unicasts are able to be effectively supported.

In one embodiment, media programs are delivered to output devices by a media delivery system. The media delivery system, often operated by a service provider, centrally manages and stores media content and also controls the secure delivery of media content to the output devices. While at the media delivery center, the media content remains encrypted. Authorized viewers are then able to experience the media content after their output devices decrypt the media content.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed below with reference to FIGS. 2–6B. However, those skilled in the art will readily appreciate that the detailed description given herein with respect to these figures is for explanatory purposes as the invention extends beyond these limited embodiments.

Figure 1:
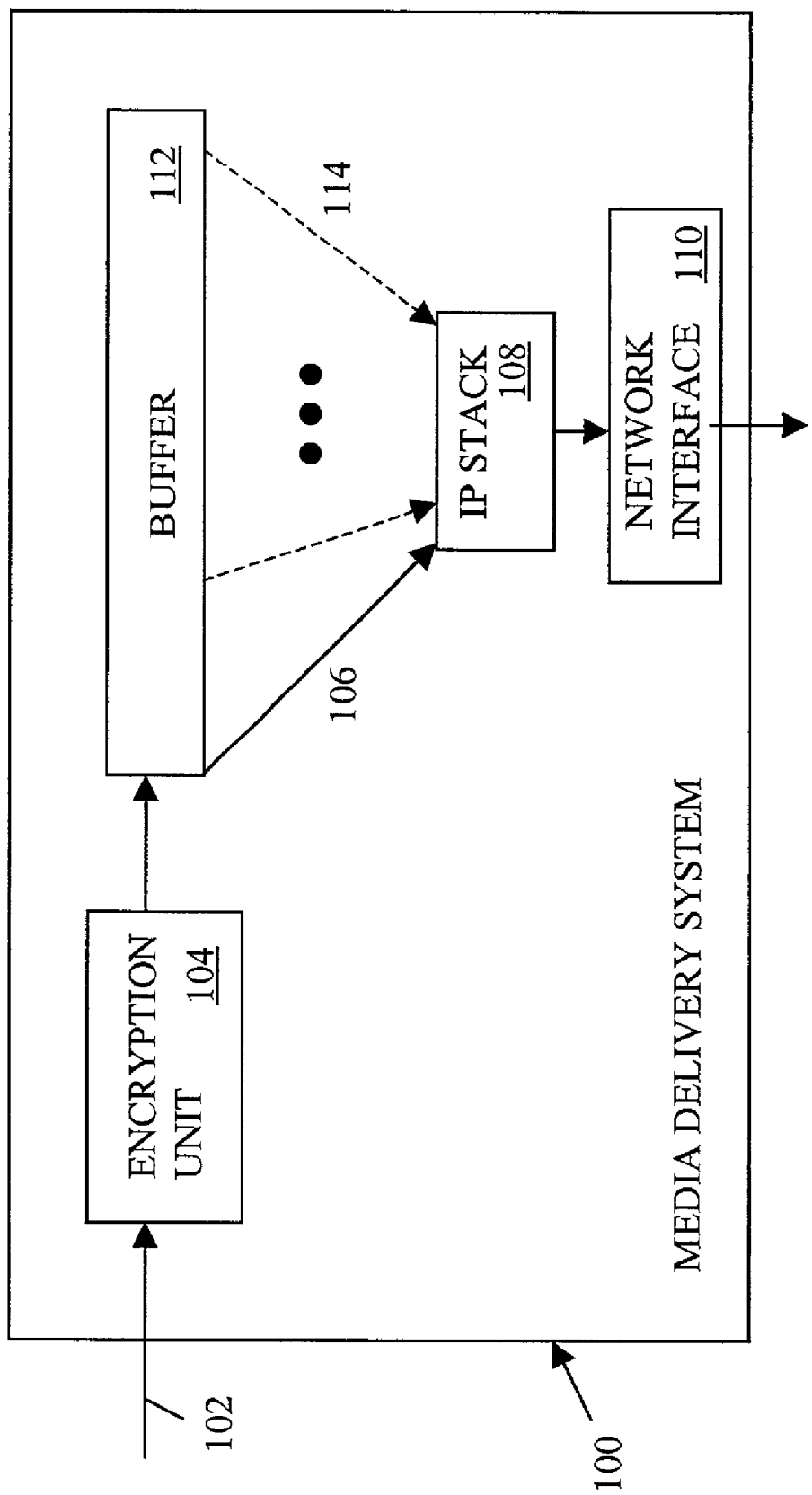
FIG. 1 illustrates a block diagram of a conventional media delivery system that provides viewer control functions.
Figure 2:
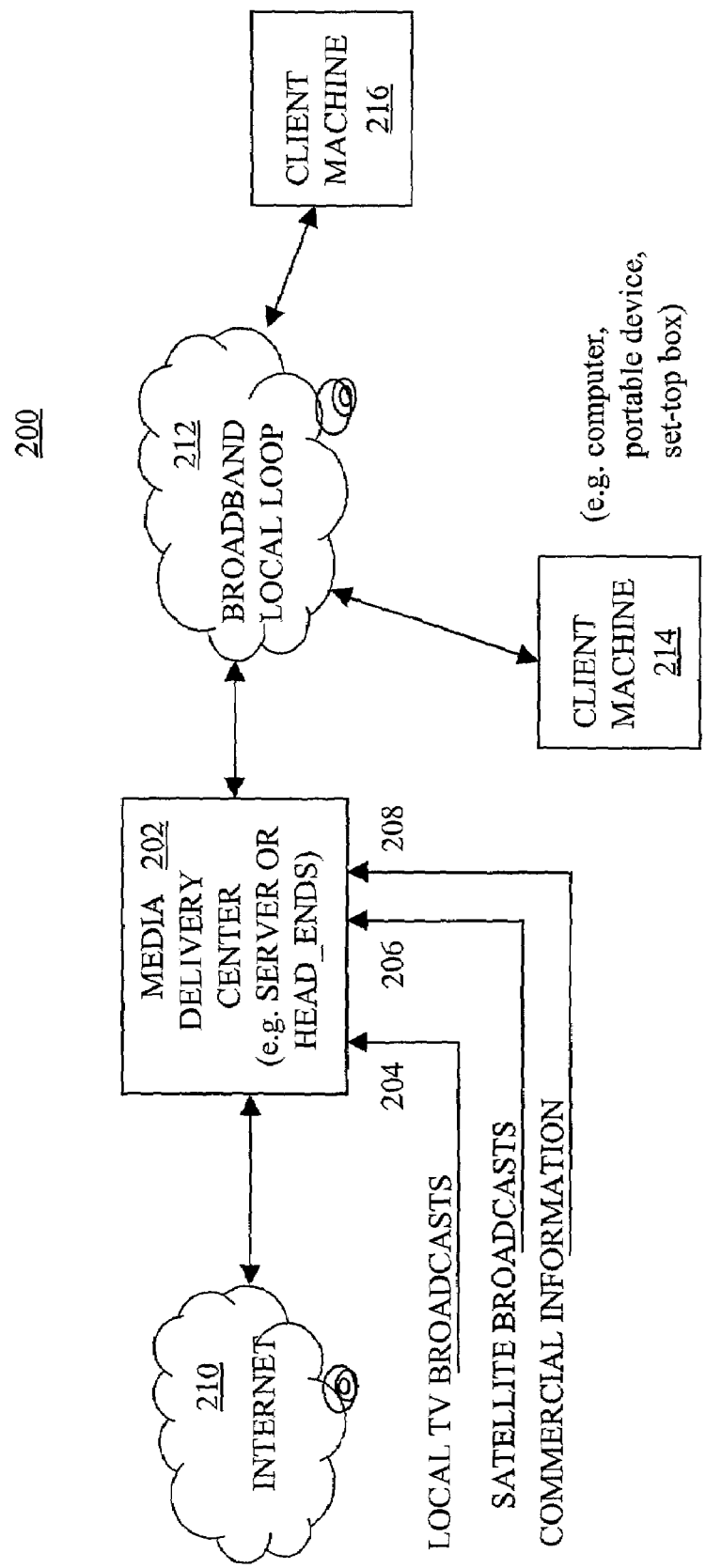
FIG. 2 is a block diagram of a data delivery system according to one embodiment of the invention.

FIG. 2 is a block diagram of a data delivery system 200 according to one embodiment of the invention. The data delivery system 200 includes a media delivery center 202 that controls the delivery of media (e.g., video) content. The media delivery center 202 receives media-rich broadcasts, such as television or video, from various sources. These media-rich broadcasts are provided by a producer, a distributor or a provider (referring to as a source or content provider) that typically makes a profit from the purchase or rental of such content by end users through a media delivery system (i.e., service provider). The end users subscribe to the media delivery system for various programs. As shown in FIG. 2, the media delivery center 202 can receive local TV broadcasts 204 and satellite broadcasts 206. The media delivery center 202 can also receive commercial information 208 that may be in video, audio or graphic forms. In addition, the media delivery center 202 can couple to the Internet 210 and thereby also receive Internet broadcasts at the media delivery center 202. Regardless of the sources of the media-rich broadcasts or programs received therefrom, the media-rich content (e.g., video content) thereof is stored in the media delivery center 202. If desired, the media-rich broadcasts or programs can be initially converted to one or more predefined formats and stored in the media delivery center 202, preferably in a digital form. Depending on an agreement between the media delivery center 202 and the producers of the programs, the retention of the programs in the media delivery center 202 may be based on a rolling feeding, temporary caching or long-term storage. According to one embodiment, the media delivery center 202 operates to receive the different types of broadcasts and to formulate them into digital content data that is subsequently broadcasted (e.g., streamed) as scheduled or as demand to various clients.

To distribute the scheduled, on-demand programs or commercial programs from the media delivery center 202, the media delivery center 202 couples through a network 212 (e.g., Internet Protocol network) to output devices 214 and 216 (client machines). In one embodiment, the network 212 is a broadband local loop. Although only two output devices 214 and 216 are shown in FIG. 2, the media delivery center 202 can support many output devices. The output devices are, for example, display screens. Such display screens can, for example, be associated with computers, televisions, portable devices, or set-top boxes. In one embodiment, the media delivery center 202 is provided in a local region and able to couple to the network 212 (e.g., local area network) and thus has access to the output devices 214 and 216. The network 212 can be a local area network, a wide area network or a global data network. By providing the network with broadband capabilities, high speed delivery of media to the output devices 214 and 216 is possible.

Figure 3A:
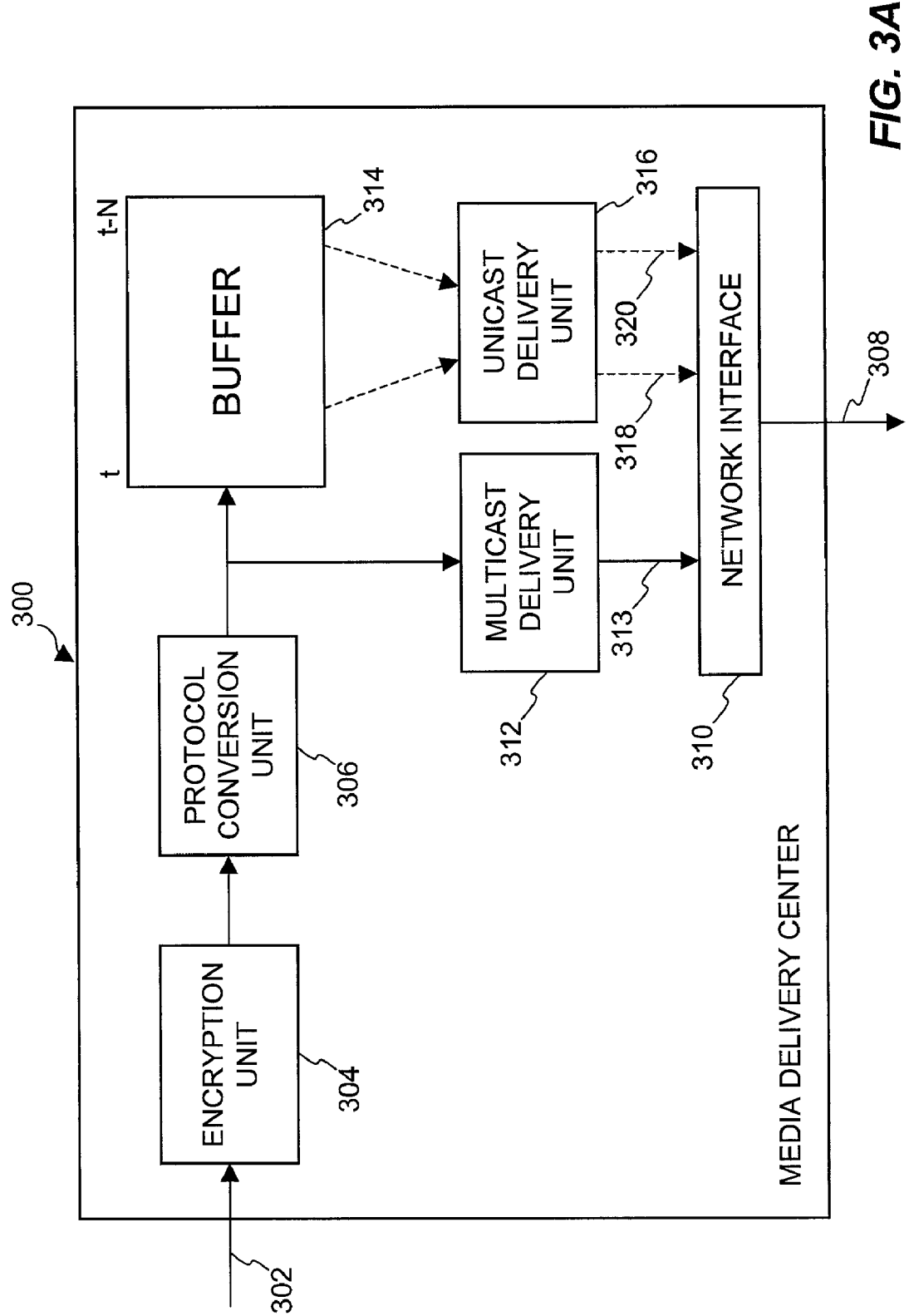
FIG. 3A is a block diagram of a media delivery center according to one embodiment of the invention.
Figure 4:
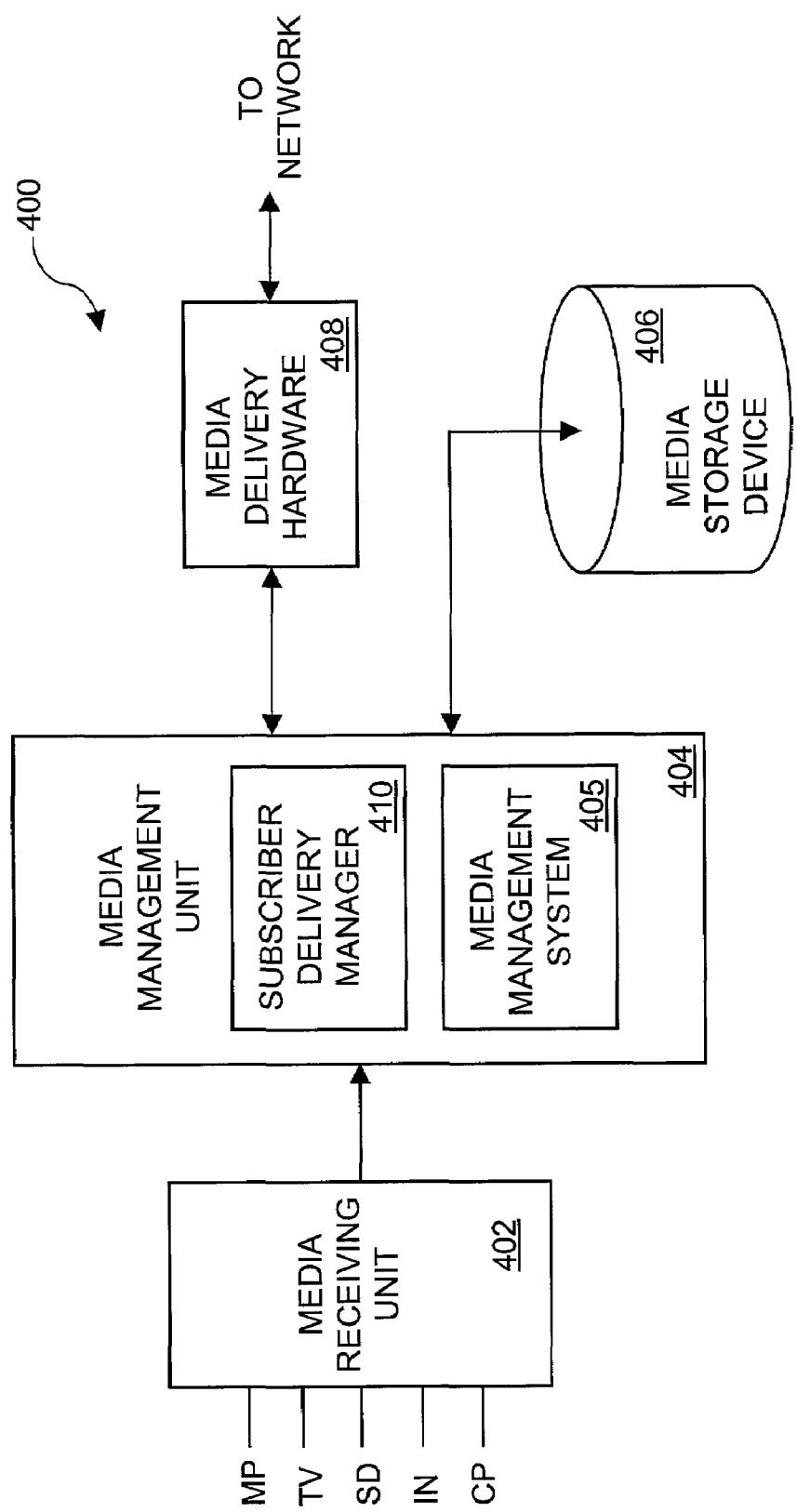
FIG. 4 is a block diagram of a media delivery center according to one embodiment of the invention.

FIG. 3A is a block diagram of a media delivery center 300 according to one embodiment of the invention. The media delivery center 300 receives media program content 302 from a source or content provider or from a media storage device (FIG. 4). The media program content 302 is encrypted by an encryption unit 304, unless already encrypted. Next, a protocol conversion unit 306 converts the media program content from its incoming broadcast format into a packet format. This process can be referred to as packetization. In one embodiment, the protocol conversion unit 306 is an IP stack. The resulting packets are then coupled to a network 308 (e.g., IP network 212 or Internet 210) by a network interface 310 and a multicast delivery unit 312. The multicast delivery unit 312 receives the packets for the media program content from the protocol conversion unit 306, and produces a multicast stream of the resulting packets that are provided to the network interface 310 via a multicast link 313. The multicast stream carries the resulting packets to a plurality of the subscribers that tune their client machine to a particular channel carrying the media program (or subscribers that otherwise desire to receive the multicast stream). A multicast address can be assigned to the plurality of subscribers as a group. Here, the resulting packets are provided in a multicast format for efficient delivery to the plurality of subscribers. According to one embodiment, the destination address (DA) can be expressed in standard "dotted-decimal" notation for IP addresses, with multicast addresses ranging from 224.0.0.0 to 239.255.255.255.

In addition, the resulting packets produced by the protocol conversion unit 306 are stored in a buffer 314. The buffer 314 is able to store (e.g., cache) the resulting packets being received from a broadcast or multicast. For example, the buffer 314 can store 1 GigaByte (GB) of data, which represents about thirty (30) to sixty (60) minutes of media content. When a subscriber requests a pause or instant replay of the cached broadcast or multicast, a unicast delivery unit 316 can formulate a unicast stream for the subscriber. A unicast stream is directed to a single subscriber (i.e., a particular network address). In formulating the unicast stream, the previously stored data packets are retrieved from the buffer 314. The network interface 310 then transmits the unicast stream to the subscriber through the network 308. Hence, in effect, the unicast delivery unit 316 can produce and support delivery/streaming of a large number of unicast streams to different subscribers. These unicast streams represent delayed versions of the broadcast (e.g., multicast stream). Here, the buffer 314 stores the resulting packets as they arrive at time t but also temporarily stores those of the resulting data packets that arrived previously at time t-N. Each of the unicast streams is directed to a different subscriber by modifying a destination address of the data packets to pertain to the network address (e.g., IP address) of the subscriber. FIG. 3A illustrates two representative unicast streams 318 and 320 that are produced for individual subscribers. By having the buffer 314 store the data packets directly, the task of the unicast delivery unit 316 is substantially less time consuming and less computationally intensive.

Figure 3B:
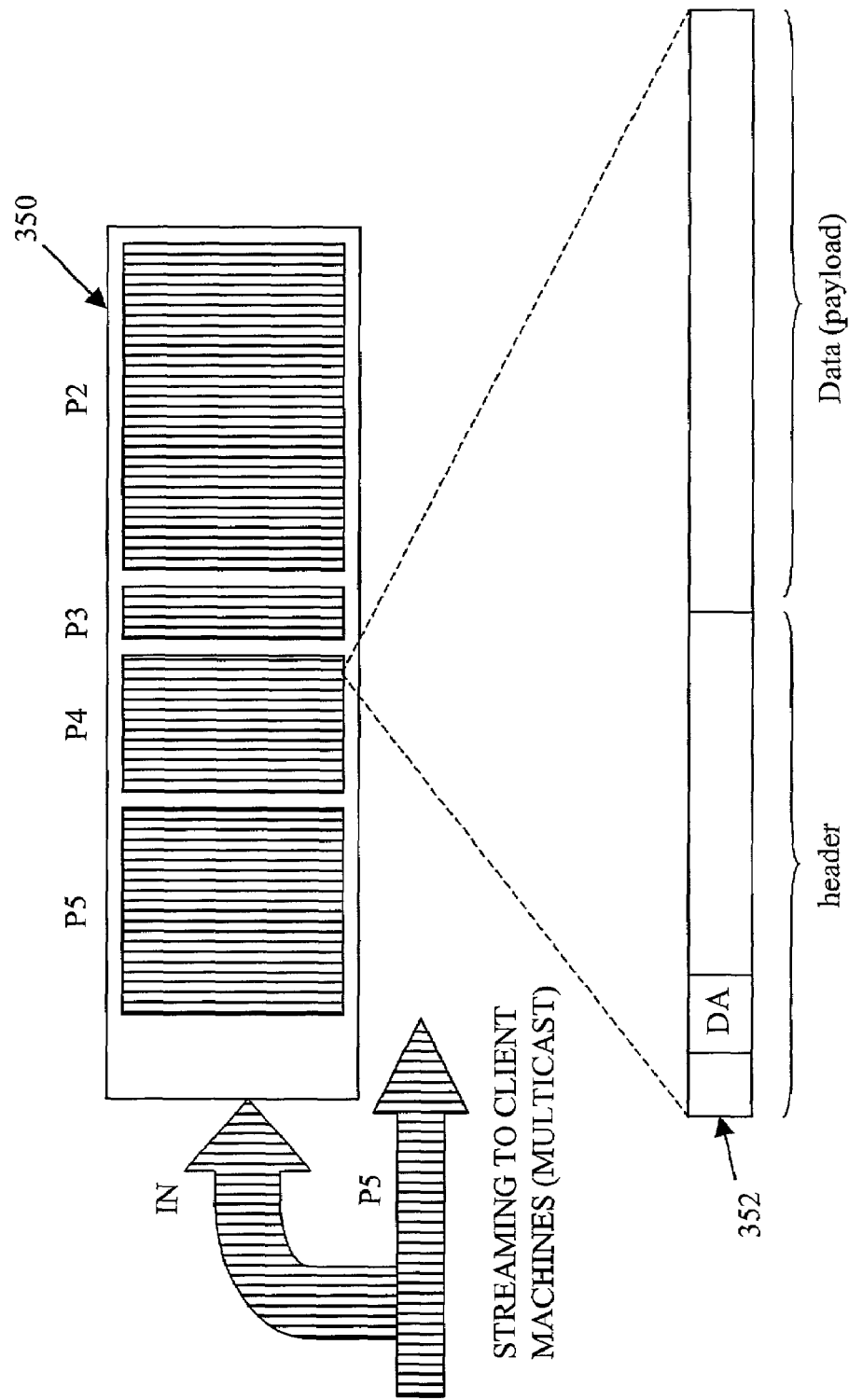
FIG. 3B is a diagram of data packets (or datagrams) stored in a buffer.

FIG. 3B is a diagram of data packets (or datagrams) stored (cached) in a buffer 350. The buffer 350 can, for example, represent the buffer 314 illustrated in FIG. 3A. The buffer 350 stores the data packets for one or more programs as they arrive. In one embodiment, the buffer 350 is configured to accommodate newly arrived packets of a program (e.g., a movie) by rolling out or pushing out those packets cached earliest. As shown in FIG. 3B, the buffer 350 stores data packets for programs P2, P3, P4 and P5 while P5 is still streaming in. To accommodate the packets representing P5, the packets representing program P1 have been rolled out or pushed out of the buffer 350. In other words, the buffer 350 has a certain capacity for a predetermined period and thus is controlled to keep a number of complete programs for the subscribers to replay any portion of the cached programs.

The data packets being stored in the buffer 350 are typically provided by the protocol conversion unit 306 shown in FIG. 3A. In the example shown in FIG. 3B, data packets for program P5 are being received at the buffer 350 and also being streamed to client machines using a multicast format. FIG. 3B also indicates a representative data packet 352 including a header and a payload. The header includes various status or control information, including a destination address (DA) for the data packet. According to one embodiment, the destination address (DA) can be expressed in standard "dotted-decimal" notation for IP addresses. The payload is a block of data for the media program.

When a subscriber requests a replay of a cached program from where it was stopped (assumed that the program is still cached in the buffer 350), the unicast delivery unit 316 is called upon to deliver a delayed portion of program P4 to the subscriber., The data packets for program P4 are retrieved from the buffer 350, from the beginning or any portion of the program. Then, to unicast the data packets to a particular requesting client machine (i.e., the subscriber), the destination address (DA) for the data packets must be altered to reflect the network address of the particular requesting client machine. In operation, the network address of the particular requesting client machine is obtained when the subscriber makes a request to pause an ongoing multicast. When the network address is recorded, the stopped location (i.e., memory address) of the program being substantially simultaneously cached in the buffer 350 is recorded. Hence, the memory address being stored indicates the pause location with respect to the program. When replay is subsequently requested, the memory address can be retrieved and used to set a replay location with respect to the program. In one embodiment, the stored memory address can be altered or updated if the stored program content is moved with the buffer 350 so that the replay location remains correct. The unicast delivery unit 316 can manage the alterations to the data packets destined for the network address of the particular requesting client machine. However, such alteration to the data packets can be rapidly performed without affecting the packet throughput. According to one embodiment, the destination address (DA) can be expressed in standard "dotted-decimal" notation.

As a result, because the buffer 350 stores the media program content in a packet format, the processing burden on the unicast delivery unit 316 is reduced as compared to convention approaches which would have required packetization processing. According, the unicast delivery unit 316 is able to support a large number of concurrent unicast streams.

FIG. 4 is a block diagram of a media delivery center 400 according to one embodiment of the invention. The media delivery center 400 represents the principal, centrally-located components of the media system. The media delivery center 400 includes a media receiving unit 402 that receives incoming media content from various media sources. The media sources include, but are not limited to, a media provider (MP), a television (TV) broadcast, a satellite dish (SD), the Internet (IN), and a commercial provider (CP). The media receiving unit 402 operates to receive the media content from the various media sources and perform encoding and/or transformation operations to present the media content in a digital form in accordance with a communication protocol used for communications between the media delivery center 400 and the output device. The resulting media content is typically in a digital format that may be one of various compressed formats (e.g., MPEG).

The media delivery center 400 also includes a media management unit 404. The media management unit 404 receives the digital media content from the media receiving unit 402 and serves to manage the delivery and storage of the media content through use of a media management system 405. The media management unit 304 can support live delivery, Near Video On-Demand (NVOD) delivery, or Media On-Demand (MOD) to subscribers over a network. In this regard, the media management unit 404 can store media content in a media storage device 406. In one embodiment, the media storage device 406 is a file server or a large database. In another embodiment, the media storage device 406 is a video server. The media content stored in the media storage device 406 can be streamed or delivered to subscribers over the network by media delivery hardware 408. As noted above, the media content can be streamed or delivered as live, nearly on-demand, or on-demand. The media delivery hardware 408 can stream or deliver the media content to subscribers over the network using one or more of unicast, multicast and broadcast approaches.

The media storage device 406 facilitates the operations of the media delivery center 400 by providing storage space to cache or store the media sources received from the media receiving unit 402. The storage spaces may include a cluster of video servers or stacks of optical or magnetic storage discs, each being labeled accordingly and accessible when contents stored therein are to be delivered.

The media management unit 404 also includes a subscriber delivery manager 410. The subscriber delivery manager 410 is responsible for managing delivery of encrypted media content to subscribers. The subscriber delivery manager 410 interacts with the media delivery hardware 408 to delivery the multicast stream and one or more unicast streams.

Client-server architecture can be utilized to implement the invention. The clients can refer to client machines that couple through a network to a server machine. The server machine is, for example, a media delivery center.

Figure 5:
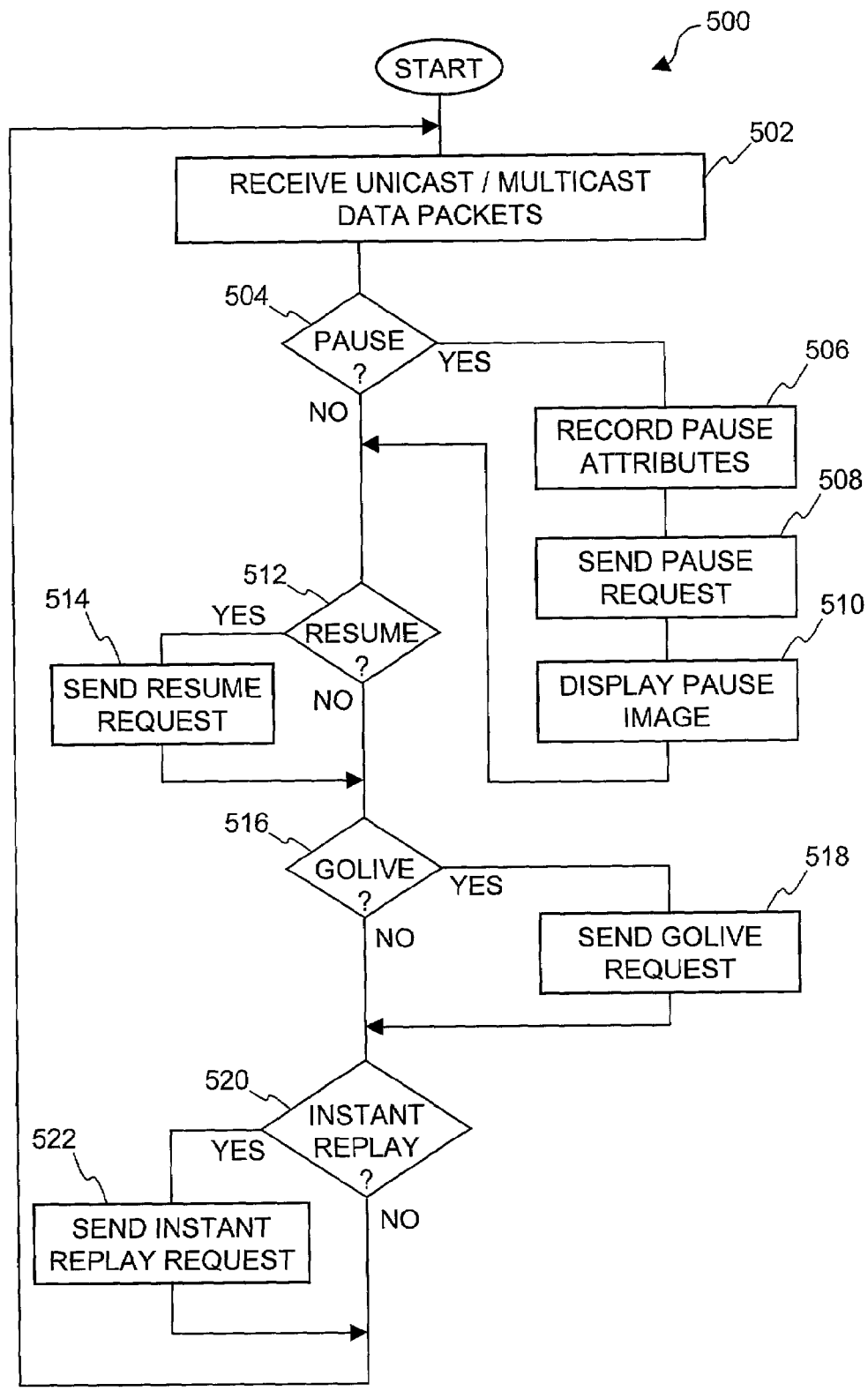
FIG. 5 is a flow diagram of client-side delivery control processing 500 according to one embodiment of the invention.

FIG. 5 is a flow diagram of client-side delivery control processing 500 according to one embodiment of the invention. The client-side delivery control processing 500 is, for example, performed by a client machine, such as the client machines 164 and 166 illustrated in FIG. 2.

The client-side delivery control processing 500, once invoked, receives 502, unicast or multicast data packets. Often, certain client devices will receive multicast data and other client devices will receive unicast data packets. At the client device, a user (e.g., subscriber) of the client device is able to interact with the client device to request various operations. These operations include, for example, pause, resume, golive, and instant replay. For example, the user of the client device can request such operations by depressing a button, by a voice command, or by other means.

Following the operation 502, a decision 504 determines whether a pause has been requested. When the decision 504 determines that the user has requested a pause operation, then pause attributes are recorded 506. The pause attributes include, for example, a time-of-pause which indicates the time when the pause operation was requested. The pause attributes typically would also include an IP address and a media stream identifier. The IP address can pertain to of the client device from which the pause operation was requested. The media stream identifier serves to identify a particular media stream or channel which was being viewed when the pause operation was requested. Next, a pause request is sent 508 to the server. Then, a pause image can be displayed 510 at the client device. Here, the pause image can be displayed on a display screen associated with the client device during the pause operation. The pause image can vary with user's preferences or selections.

Following the operation 510, as well as directly following the decision 504 when a pause operation has not been requested, a decision 512 determines whether a resume operation has been requested. When the decision 512 determines that a resume operation has been requested, then a resume request is sent 514 to the server.

Following the operation 514, as well as directly following the decision 512 when the resume operation has not been requested, a decision 516 determines whether a golive operation has been requested. When the decision 516 determines that a golive operation has been requested, then a golive request is sent 518 to the server. Following the operation 518, as well as directly following the decision 516 when the golive operation has not been requested, a decision 520 determines whether an instant replay operation has been requested. When the decision 520 determines that an instant replay operation has been requested, then an instant replay request is sent 522 to the server. Following the operation 522, as well as directly following the decision 520 when an instant replay operation has not been requested, then the client-side delivery control processing 500 returns to repeat the decision 502 and subsequent operations.

Figure 6A:
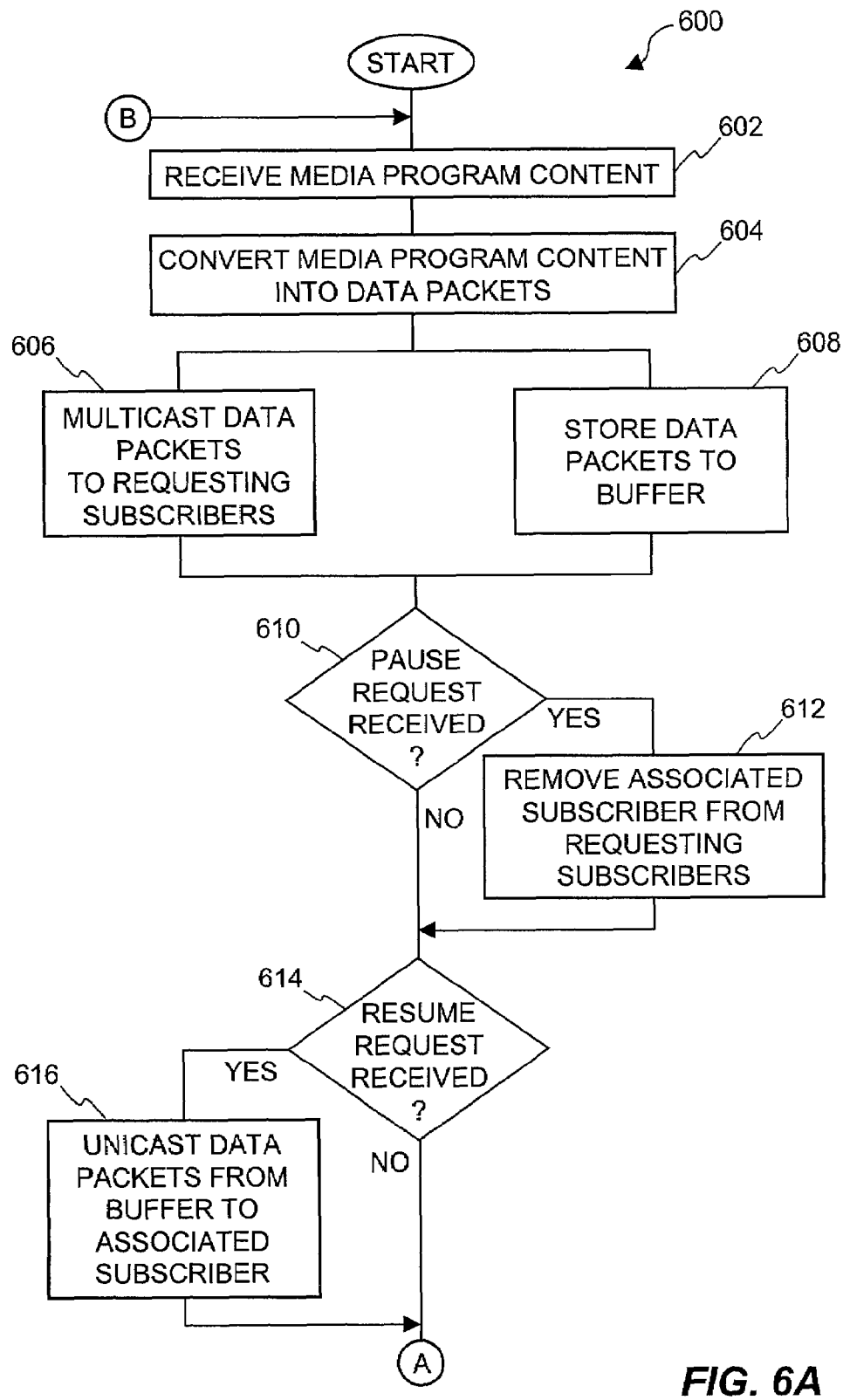
FIGS. 6A and 6B are flow diagrams of server-side delivery control processing according to one embodiment of the invention.
Figure 6B:
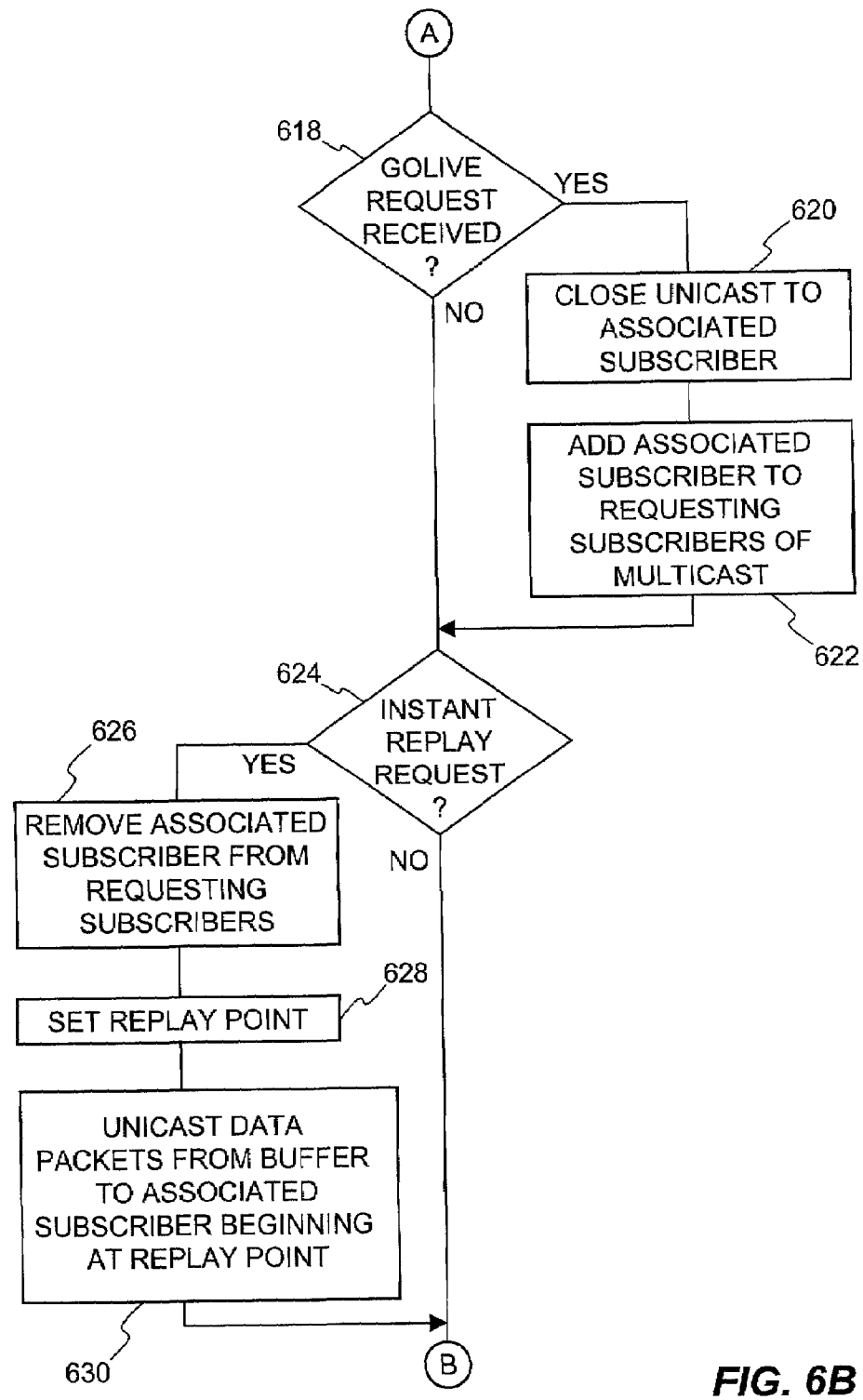

FIGS. 6A and 6B are flow diagrams of server-side delivery control processing 600 according to one embodiment of the invention. The server-side delivery control processing 600 is, for example, performed by a media delivery center, such as the media delivery center 202 illustrated in FIG. 2 or the media delivery center 400 illustrated in FIG. 4.

The server-side delivery control processing 600 initially receives 602 media program content. The media program content is typically streaming video associated with a particular media program being broadcast over a particular channel. The media program content can be sent to the media delivery center from an external media source or can be retrieved from a media storage device (e.g., media storage device 406) associated with the media delivery center. In any case, as the media program content is being received 602, the media program content can be converted 604 into data packets. Typically, the media program content is received in a compressed and/or encrypted format, but not in a data packet format. Hence, the conversion 604 operates to packetized the media program content to form data packets. Next, the data packets are multicasted 606 to requesting subscribers. The requesting subscribers are those subscribers (viewers) that are operating their client machine to "tune-in" the particular channel "playing" the media program content. Concurrently with the multicasting 606, the data packets are stored 608 to a buffer. The buffer permits time-shifting with respect to the media program as discussed in more detail below.

Following the operations 606 or 608, a decision 610 determines whether a pause request has been received. Here, the server-side delivery control processing 600 determines whether a pause request has been received from a client device. When the decision 610 determines that a pause request has been received, then the subscriber associated with the pause request (associated subscriber) is removed 612 from being a requesting subscriber of the media program content being multicasted 606. In other words, after being removed 612, the client device associated with the subscriber will no longer be receiving the data packets associated with the media program content.

Following the operation 612, as well as directly following the decision 610 when the decision 610 determines that a pause request has not been received, a decision 614 determines whether a resume request has been received. When the decision 614 determines that a resume request has been received, then the data packets associated with the media program content are unicasted 616 from the buffer to the associated subscriber. Here, the resume operation follows a previous pause operation. Hence, once the "playing" of the media program is resumed, the client device associated with the subscriber then receives the data packets associated with the media program from the buffer using a unicast transmission scheme. In other words, to provide a smooth transmission during pause and resume operations, the buffer provides the time-shift capability necessary to support pause and replay operations.

Following the operation 616, as well as directly following the decision 614 when the decision 614 determines that a resume request has not been received, then a decision 618 determines whether a golive request has been received. When the decision 618 determines that a golive request has been received, then the unicast connection to the associated subscriber is closed 620. Additionally, the associated subscriber is again added 622 to the requesting subscribers of the multicast. Here, it is assumed that a pause request and then a resume request proceeded the golive request.

Following the operation 622, as well as directly following the decision 618 when the decision 618 determines that a golive request has not been received, a decision 624 determines whether an instant replay request has been received. When the decision 624 determines that an instant replay request has been received, the associated subscriber for the instant replay request is removed 626 from the requesting subscribers associated with the multicast of the media program content. Next, a replay point is set 628. The replay point is an offset amount that represents the duration of time that should be jumped to in order to provide an instant replay operation. For example, the replay point could be 5 seconds backwards in time. The offset amount for the replay point can be predetermined, subscriber-determined/controller, or content-type dependent. Then, data packets are unicast 630 from the buffer to the associated subscriber beginning at the replay point. Following the operation 630, as well as directly following the decision 624 when an instant replay request has not been received, the server-side delivery control processing 600 returns to repeat the operation 602 and subsequent operations.

The invention can be implemented in software or hardware or a combination of both. Portions of the invention can also be embodied as computer readable code on a computer readable medium. The computer readable media can be any data storage device that can store data such that it can thereafter be read by a computer system. Examples of computer readable media include read-only memory, random-access memory, disk drives, floppy disks, CD-ROMs, DVDs, magnetic tape, optical data storage devices, carrier waves, etc. The computer readable media can also be distributed over network-coupled computer systems so that the computer readable code is stored and executed in a distributed fashion.

The advantages of the invention are numerous. Different embodiments or implementations may yield one or more of the following advantages. One advantage of the invention is that a media delivery center has an improved architecture better suited for efficient delivery of multicast and unicast media streams to viewers. Another advantage of the invention is that unicast streams are able to be supported with significantly less resources (processor computations and processor-to-system memory bandwidth) and thus numerous simultaneous unicasts can be supported.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for delivering media program content to users over a network, said method comprising:

receiving media program content to be delivered to one or more users;

converting the media program content being received into data packets;

multicasting a plurality of streams of the data packets to those of the users desirous of viewing the media program content, wherein first one of the streams is a live broadcast of the media program content and remaining streams are predetermined time shifted duplicates of said live broadcast;

storing the plurality of streams of the data packets into a buffer storage device;

removing a particular user out of the users receiving said multicasting upon receiving a pause request from the particular user, the pause request including a number of pause attributes;

subsequently receiving a resume request from the particular user;

unicasting, in response to the resume request, one of the streams of the data packets to the particular user from the buffer storage device in accordance with the pause attributes associated therewith;

subsequently receiving a golive request from the particular user;

adding, in response to the golive request, the particular user to the users receiving said live broadcast; and stopping, in response to the golive request, said unicasting one of the streams of the data packets to the particular user from the buffer storage device.

2. A method as recited in claim 1, wherein the data packets are IP packets.

3. A method as recited in claim 3, wherein the pause attributes include an IP address of a client machine being used the particular user.

4. A method as recited in claim 3, wherein said unicasting one of the streams of the data packets comprises updating each of the data packets being delivered to the particular user with the IP address of the client machine.

5. A method as recited in claim 1, wherein the pause attributes comprises a pause point, and wherein said unicasting comprises retrieving one of the streams of the data packets from the buffer storage device in accordance with the pause point.

6. A method as recited in claim 1, wherein said method further comprises:

receiving an instant replay request from the particular user receiving said multicasting;

removing, in response to the instant replay request, the particular user from the users receiving said multicasting; and unicasting, in response to the instant replay request, the data packets to the particular user from the buffer storage device in accordance with a replay point.

7. A method as recited in claim 6, wherein the replay point is a predetermined backwards time shift.

8. A method for delivering media program content to subscribers in accordance with subscriber control, said method comprising:

receiving media program content to be delivered to one or more subscribers;

converting the media program content being received into data packets;

multicasting a plurality of streams of the data packets to those of the subscribers desirous of viewing the media program content, wherein first one of the streams is a live broadcast of the media program content and remaining streams are predetermined time shifted duplicates of said live broadcast;

storing the plurality of streams of the data packets into a buffer storage device;

receiving a pause request from a particular subscriber of the subscribers receiving said multicasting, the pause request including at least pause attributes;

removing, in response to the pause request, the particular subscriber of the subscribers receiving said multicasting;

subsequently receiving a resume request from the particular subscriber;

unicasting, in response to the resume request, one of the streams of the data packets to the particular subscriber from the buffer storage device in accordance with the pause attributes associated therewith;

subsequently receiving a golive request from the particular subscriber;

adding, in response to the golive request, the particular subscriber to the subscribers receiving said live broadcast; and stopping, in response to the golive request, said unicasting one of the streams of the data packets to the particular user from the buffer storage device.

9. A method as recited in claim 8, wherein said multicasting and said storing are performed at substantially the same time.

10. A method as recited in claim 8, wherein the data packets are IP packets, and wherein the pause attributes include an IP address for a terminal associated with the particular subscriber.

11. A method as recited in claim 8, wherein the pause attributes comprises a pause point, and wherein said unicasting comprising retrieving one of the streams of the data packets from the buffer storage device in accordance with the pause point.

12. A method as recited in claim 8, wherein said multicasting transmits the data packets over a network to those of the subscribers desirous of viewing the media program content, and wherein said unicasting transmits the data packets over the network to the particular subscriber.

13. A method as recited in claim 8, wherein said method further comprises:

receiving an instant replay request from the particular subscriber receiving said multicasting;

removing, in response to the instant replay request, the particular subscriber from the subscribers receiving said multicasting; and unicasting, in response to the instant replay request, one of the streams of the data packets to the particular subscriber from the buffer storage device in accordance with a replay point.

14. A method as recited in claim 13, wherein the replay point is a predetermined backwards time shift.

15. A media delivery center that couples to a network for delivery of media program contents to users, said media delivery center comprising:

a protocol conversion unit that receives a media stream of a media program and converts the media stream into data packets;

a network interface that couples to a physical network;

a multicast delivery unit, operatively connected to said protocol conversion unit and said network interface, that delivers the data packets for the media program to a plurality of users in a multicasting fashion;

a buffer that stores the data packets for the media program;

a unicast delivery unit, operatively connected to said buffer and said network interface, that delivers the data packets for the media program from said buffer to individual users in a unicasting fashion; and a media management unit that operatively interacts with said multicast delivery unit and said unicast delivery unit to deliver the data packets by performing operations of:

receiving media program content to be delivered to one or more users;

converting the media program content being received into data packets;

multicasting a plurality of streams of the data packets to those of the users desirous of viewing the media program content, wherein first one of the streams is a live broadcast of the media program content and remaining streams are predetermined time shifted duplicates of said live broadcast;

storing the plurality of streams of the data packets into a buffer storage device;

receiving a pause request from a particular user of the users receiving said multicasting, the pause request including at least pause attributes;

removing, in response to the pause request, the particular user of the users receiving said multicasting;

subsequently receiving a resume request from the particular user;

unicasting, in response to the resume request, one of the streams of the data packets to the particular user from the buffer storage device in accordance with the pause attributes associated therewith;

subsequently receiving a golive request from the particular user;

adding, in response to the golive request, the particular user to the users receiving said live broadcast;

stopping, in response to the golive request, said unicasting one of the streams of the data packets to the particular user from the buffer storage device;

receiving an instant replay request from the particular user receiving said multicasting;

removing, in response to the instant replay request, the particular user from the users receiving said multicasting; and unicasting, in response to the instant replay request, one of the streams of the data packets to the particular user from the buffer storage device in accordance with a replay point.

16. A media delivery center as recited in claim 15, wherein said protocol conversion unit performs a packetization on the media stream in producing the data packets.

17. A media delivery center as recited in claim 15, wherein the media stream is encrypted and remains encrypted after being converted into the data packets for the media stream.

18. A media delivery center as recited in claim 15, wherein the delivery of the data packets for the media program to a plurality of users in the multicasting fashion is performed in accordance with a schedule, and wherein the delivery of the data packets for the media program from said buffer to individual users in the unicasting fashion provides delayed delivery of the media program to the individual users.

19. A media delivery center as recited in claim 18, wherein the media stream is encrypted and remains encrypted after being converted into the data packets for the media stream.

20. A media delivery center as recited in claim 19, wherein said protocol conversion unit performs a packetization on the media stream in producing the data packets.

21. A media delivery center as recited in claim 15, wherein each of the users has a network address associated therewith, and wherein said unicast delivery unit operates to modify the data packets for the media program from said buffer that are to be delivered to a particular one of the individual users in the unicasting fashion by modifying a destination address of the data packets to reflect the network address of the particular one of the individual users.

22. A media delivery center as recited in claim 21, wherein said protocol conversion unit performs a packetization on the media stream in producing the data packets.

* * * * *